(12) United States Patent  
Ford et al.

(10) Patent No.: US 8,160,861 B2  
(45) Date of Patent: Apr. 17, 2012

(54) SYSTEM AND METHOD FOR MODELLING A HARDWARE COMPONENT OF A DATA PROCESSING APPARATUS

(75) Inventors: Simon Andrew Ford, Cambridge (GB); Paul Halliday Peeling, Cambridge (GB)

(73) Assignee: ARM Limited, Cambridge (GB)

( * ) Notice: Subject to any disclaimer, the term of this patent is extended or adjusted under 35 U.S.C. 154(b) by 1037 days.

(21) Appl. No.: 12/007,634

(22) Filed: Jan. 14, 2008

(65) Prior Publication Data

US 2008/0189086 A1    Aug. 7, 2008

(30) Foreign Application Priority Data

Feb. 1, 2007 (GB) .................................. 0701948.2

(51) Int. Cl.  
*G06F 9/44* (2006.01)

(52) U.S. Cl. ........................................................ 703/21

(58) Field of Classification Search .................. 703/2, 21  
See application file for complete search history.

(56) References Cited

U.S. PATENT DOCUMENTS

| | | | | |
|---|---|---|---|---|
| 7,484,096 B1 * | 1/2009 | Garg et al. | ..................... | 713/170 |
| 7,698,692 B1 * | 4/2010 | Garud et al. | ..................... | 717/130 |
| 2001/0054032 A1 * | 12/2001 | Goldman et al. | ............... | 706/12 |

OTHER PUBLICATIONS

Eeckhout et al. 2003 IEEE, Sep.-Oct. 2003, Statistical Simulation: Adding Efficiency to the Computer Designers Toolbox. p. 26-38.*  
Brooks et al. "Wattch: A Framework for Architectural-Level Power analysis and Optimizations", ACM 2000, p. 83-94.*  
Tiwari et al., "Instruction Level Power Analysis and Optimization of Software," (1996), pp. 1-18.  
Varma et al., "Instruction-Level Power Dissipation in the Intel XScale Embedded Microprocessor," 8 pgs.  
Chen et al., "Architecture-Level Power Estimation and Design Experiments," (2001), pp. 50-66.  
Joseph et al., "A Predictive Performance Model for Superscalar Processors," (2006), 10 pgs.  
Lee et al., "Accurate and Efficient Regression Modeling for Microarchitectural Performance and Power Prediction," (2006), pp. 185-194.  
Ipek et al., "Efficiently Exploring Architectural Design Spaces via Predictive Modeling," (2006), 12 pgs.  
Gebotys et al, "An Empirical Comparison of Algorithmic, Instruction, and Architectural Power Prediction Models for High Performance Embedded DSP Processors," (1998), pp. 121-123.  
Huang, "An Approach to Program Testing," (1975), pp. 113-128.  
Qu et al, "Code Coverage-Based Power Estimation Techniques for Microprocessors," *Journal of Circuits, Systems, and Computers*, vol. 11 No. 5 (2002), pp. 1-18.

* cited by examiner

*Primary Examiner* — Paul Rodriguez  
*Assistant Examiner* — Eunhee Kim  
(74) *Attorney, Agent, or Firm* — Nixon & Vanderhye P.C.

(57) ABSTRACT

The system comprises a component model for modelling aspects of the hardware component, and feature extraction logic for extending the component model to cause the component model, when executing, to output one or more features identifying execution behavior of the component model. A statistical model is then arranged to receive the one or more features output by the component model, and to generate the output dependent on one or more features. The component model may not explicitly model features that can be used to effectively predict values of the observable property, features that a statistical model depends on may still be captured in the underlying logic and implementation of the component model. By extracting features identifying execution behavior of the component model, this can provide a suitable input to the statistical model.

22 Claims, 8 Drawing Sheets

DURING TRAINING

IN USE (AFTER TRAINING)

Initial Code Segment

```
case (instruction) {
        ADD:  add();
        MUL:  mul();
        LD:   load();
}
```

↓ Annotated by feature extraction tool

```
case (instruction) {   c0++;
        ADD:  add(); c1++;
        MUL:  mul(); c2++;
        LD:   load(); c3++;
}
```

FIG. 7

If observable property is "adder in use"

| Sample training Code Sequence | Reference Data 1= adder in use 0= adder not in use | c0 | c1 | c2 | c3 |
|---|---|---|---|---|---|
| ADD | 1 | 1 | 1 | 0 | 0 |
| ADD | 1 | 1 | 1 | 0 | 0 |
| MUL | 0 | 1 | 0 | 1 | 0 |
| LD  | 1 | 1 | 0 | 0 | 1 |
| LD  | 1 | 1 | 0 | 0 | 1 |
| MUL | 0 | 1 | 0 | 1 | 0 |

Reference Data → Pattern Detection ← Features

Table encoding
if c1 or c3 set
output = 1
else output = 0

FIG. 8

SYSTEM AND METHOD FOR MODELLING A HARDWARE COMPONENT OF A DATA PROCESSING APPARATUS

BACKGROUND OF THE INVENTION

1. Field of the Invention

The present invention relates to a system and method for modelling a hardware component of a data processing apparatus.

2. Background of the Invention

Architects use models to assist making decisions and trade-offs when designing hardware systems. It is common to use different types of models when there are different modelling requirements; common model trade-offs are levels and aspects of accuracy, execution speed, and the cost of developing and using the models.

As an example, a CPU design will often have a netlist representation, providing details of the individual gates and interconnections within the design. Combined with a hardware simulator this provides a model with relatively high level of simulation accuracy whilst being easy to generate.

However, for some applications this model would not be appropriate. For a programmer wanting to simulate software running on the CPU, the simulation speeds will often be too slow, the required tools too expensive, the model format not practical or the netlist IP not available. A common solution for this target audience would be a second "higher level" model such as a Cycle Accurate model which provides a different modelling trade-off, modelling only the aspects required to run the software correctly to the accuracy of a cycle. By reducing the aspects of the design being modelled to only those required by the use scenario, models can be made with reduced complexity, execution time and reliance on particular simulation tools or IP.

In the following description, the term "lower level model" will be used to refer to more detailed larger models, and the term "higher level model" will be used to refer to less detailed smaller models which are typically quicker to run. It will be appreciated that these two terms are relative terms, and hence when comparing two particular models, one will be a higher level model than the other. However, a model that in one situation is viewed as a higher level model may in another situation be viewed as a lower level model, depending on the model with which it is being compared.

Providing an alternative, higher level, model will have an associated cost due to the required development effort. In addition to the development effort, there is often a challenge in under standing how to abstract the aspects captured in one model to another. For example, when modelling a hardware component there are certain observable properties of the hardware component which are more difficult to model, and a good example of this can be demonstrated by considering power consumption.

A number of existing hardware power models have been developed, which have focussed on software and processor power estimation. As an example, the article "Instruction Level Power Analysis and Optimisation of Software", by V Tiwari et al, Journal of VLSI Signal Processing, 1-18 (1996), introduces the concept of Instruction Level Power Analysis (ILPA) which tries to estimate power of a processor based on the instructions that it executes. In particular, in accordance with this technique, each different type of instruction is annotated with a power value which is then reported every time it executes. This annotation is usually achieved by measuring the power consumed by executing the same instruction multiple times and then averaging the power. The article "Instruction-Level Power Dissipation in the Intel XScale Embedded Microprocessor", by A Varma et al, University of Maryland, College Park, Md. and Intel Labs, Santa Clara, Calif., extends the ILPA technique to consider other aspects such as interlocks, cache behaviour, etc.

Both of the above described techniques are based on calculating an average value for an observable instruction/condition, and then emitting that average value when the observable instruction or condition is observed again. Such techniques are clearly only useful when modelling processor-type devices where sequences of instructions are being executed. Further, such techniques only provide a relatively approximate indication of power consumed, since they do not take into account the complex interaction between elements of the processor being modelled which may cause variations in power consumption which cannot accurately be modelled merely by associating a particular power consumption with an instruction each time it is observed. Further, such techniques require the presence of identifiable modelled features which already exist, for example a knowledge of what instructions are executed and what power to associate with each type of instruction.

An alternative technique which has been developed for modelling power is known as the "Functional Level Power Analysis" (FLPA) technique, which attempts to model parameters which have an impact on power consumption, and form a relationship between the parameter and the power consumption. For example, the article "Architecture-Level Power Estimation and Design Experiments" by R Chen et al, ACM Transactions on Design Automation of Electronic Systems, Volume 6, Number 1, January 2001, pages 50 to 66, describes a technique which provides cycle-by-cycle power consumption using functional models of processor components. To achieve this, the component to be modelled is analysed, and then power models for the various elements that constitute that component are written (for example based on load model approximations), these individual power models estimating the power consumed by the associated element based on important parameters the designer chooses. This provides a constructed model which can be adjusted to improve accuracy, but requires the writing of explicit models for each of the elements within the component being modelled. In the article, a processor is considered, and a power model written for each of the constituent elements, for example the Arithmetic Logic Unit (ALU), Multiply Accumulate Unit (MAC), Register File, etc. When the operations of these various elements are specified by the instruction stream, the power consumed in each such element is calculated from its power model.

Accordingly, whilst such an approach can provide a higher level of accuracy of power estimation when compared with the earlier-mentioned ILPA technique, such FLPA techniques require a significant amount of modelling effort to produce the various power models for the individual elements of the component, for example the Register File, ALU, MAC, etc, and to generate the input stimulus required to trigger those power models, for example determining when the Register File is used, when the ALU is used, etc.

From the above discussion, it can be seen that a number of techniques are known for estimating values of observable properties of a hardware component that are difficult to model directly, for example power, but these techniques are either relatively inaccurate (e.g. in the ILPA technique as described above) or are relatively complex to implement (for example the FLPA technique as described above).

Another known area of modelling is statistical modelling, and it is known to use such statistical models for design space exploration. Statistical models use knowledge of results from a small sample of inputs to build models capable of predicting results for a much larger set of inputs. When performing hardware design space exploration, there are a huge cross product of options available, which makes detailed simulation very complex and time consuming. As an alternative to such detailed and complex simulation, studies have been performed to seek to use statistical models for such design space exploration, in order to avoid having to run a huge number of simulations in order to get performance metrics (for example cycles per instruction (CPI)) for such a cross product of design parameters (for example pipeline length, cache size, etc). Such statistical modelling techniques are described in the articles "A Predictive Performance Model for Superscalar Processors" by P Joseph et al, the 39th Annual IEEE/ACM International Symposium on Microarchitecture (Micro '06), "Accurate and Efficient Regression Modelling for Microarchitectural Performance and Power Prediction" by B Lee et al, ASPLOS '06, Oct. 21 to 25, 2006, San Jose, Calif., USA, and "Efficiently Exploring Architectural Design Spaces Via Predictive Modelling" by E Ipek et al, ASPLOS '06, Oct. 21 to 25, 2006, San Jose, Calif., USA.

The techniques described in these papers generally take a sample of combinations of design parameters, run on an accurate model, in order to train the parameters of a statistical model. The statistical model is then used to represent all combinations without accurate simulation allowing designers to understand the impact of design parameters. Hence, such techniques are trying to predict a performance metric, such as average CPI, for all combinations of the design space parameters by performing accurate simulation for a few combinations, and then using statistical analysis to interpolate in order to give results for all possible combinations. In addition to inputting design space parameters into the statistical model, in the second paper mentioned above, namely the paper entitled "Accurate and Efficient Regression Modelling for Microarchitectural Performance and Power Prediction", summary information gathered from an execution run on the accurate model (for example number of cache misses) is also input to the statistical model.

The article "An Empirical Comparison of Algorithmic, Instruction, and Architectural Power Prediction Models for High Performance Embedded DSP Processors" by C Gebotys et al, ISLPED '98, Aug. 10 to 12, 1998, Monterey, Calif. USA, presents a comparison of probabilistic power prediction models at the algorithmic, instruction, and architectural levels for embedded high performance DSP processors. The paper discusses using statistical modelling to verify that an accurate power model can be derived for DSP embedded software. As in the previously mentioned examples, it uses instructions and modelled aspects available from a model to derive its results.

Hence, from the above papers on statistical modelling, it will be appreciated that statistical models can help to significantly reduce complexity, but it is necessary to be able to provide the statistical model with suitable input stimulus in order to enable the statistical model to be able to output reliable values for the modelled aspect. Within the area of design space exploration, statistical models can work well, as there is a lot of information available to base predictions on in order to obtain accurate results. Further, such statistical models have generally been used to produce information of an averaged nature, in particular performance characteristics such as CPI, and have not been used to generate values for observable properties which may vary on a cycle-by-cycle basis. When considering observable properties which are difficult to model, such as power consumption, information available from known power models, for example on a cycle-by-cycle basis, is limited, as only certain aspects are explicitly modelled. As a result, the output from such models will not typically serve as useful input stimulus to a statistical model, and accordingly it has up to now not been possible to readily make use of statistical models when seeking to model such observable properties of a hardware component.

In the unrelated field of computer program testing, it is known to use code coverage techniques to monitor execution patterns of programs. For example, the article "An Approach to Program Testing" by J Huang, Computer Surveys Volume 7, Number 3, September 1975, is an early document providing an introduction to the concept of testing programs by monitoring their execution patterns. This "code coverage" technique is used in program testing to get an idea of the amount of the program behaviour which is exercised by testing. The technique involves annotating code with certain counters and then using these counters to record which statement (statement coverage) or decisions (edge coverage) occur when a program is run. By such techniques, it can be determined what functionality may not have been well tested. The code is often modified by a compiler to add the annotations needed to modify the behaviour.

The article "Code Coverage-Based Power Estimation Techniques for Microprocessors" by G Qu et al, Journal of Circuits, Systems, and Computers, Volume 11, Number 5 (2002), 1-18, describes a code coverage technique for estimating the power consumption of an application running on a processor. This monitors execution of the application program to track which functions/instructions in the application are being executed, and uses this to build up a table of power values associated with functions/instructions during a training phase, and to thereafter determine the power used by an executing application. Accordingly, the technique described therein is in many ways similar to the earlier mentioned ILPA technique, but considers functions instead of just instructions.

It would be useful to develop a technique which would enable observable properties of a hardware component that are not straightforward to model to be modelled by a relatively simple mechanism, thereby avoiding the need to develop complex models which are expensive and take a long time to run.

SUMMARY OF THE INVENTION

Viewed from a first aspect, the present invention provides a system for modelling a hardware component of a data processing apparatus in order to generate an output identifying a value of an observable property of the hardware component, comprising: a component model for modelling aspects of the hardware component; feature extraction logic for extending the component model to cause the component model when executing to output one or more features identifying execution behaviour of the component model; and a statistical model arranged to receive said one or more features output by the component model, and to generate said output dependent on said one or more features.

In accordance with the present invention, a system for modelling a hardware component of a data processing apparatus comprises both a component model for modelling aspects of the hardware component, and a statistical model. The statistical model generates an output identifying a value of an observable property of the hardware component. The component model only models certain aspects of the hardware component, and accordingly the standard output produced by the component model is unlikely, at least by itself, to present a suitable input to the statistical model to enable it to generate its output. However, in accordance with the present invention, feature extraction logic is also provided for extending the component model to cause the component model when executing to output one or more features identifying execution behaviour of the component model, and these one or more features are then received by the statistical model, from which the statistical model then generates the output identifying a value of the observable property of the hardware component.

Hence, in accordance with the present invention, it has been observed that although the component model may not explicitly model aspects that can be used by the statistical model to effectively predict values of the observable property, the things that the statistical model depends on may still be captured in the underlying logic and implementation of the component model. Accordingly, by extracting one or more features identifying execution behaviour of the component model, this extracted information can provide a suitable input to the statistical model to enable it to generate the desired output. Accordingly, through use of the feature extraction logic, it has become possible to use statistical models (such as have been used in the design space exploration area) driven by runtime stimulus of component models (not typically used in design space exploration) in order to model runtime observable properties of a hardware component, for example power as a model executes.

Considering the particular example of seeking to model processor power, the component model may not model when an internal unit of the processor is clock gated. However, the real device is likely to clock gate based on whether the unit is in use. Although the model does not model this behaviour, it is likely that it can be inferred from other decisions being made in the model code for other reasons, for example by observing part of the instruction decoder and control logic. Although the model programmer did not explicitly model the behaviour that desirably should be evaluated in order to determine processor power, it can be inferred to some degree from the execution behaviour of the component model.

Accordingly, through use of the present invention, statistical modelling is used to infer desired behaviour from the execution behaviour of a component model with which it is coupled, thereby providing a relatively simple mechanism for generating a value of an observable property of the hardware component as the component model executes. Such a technique can be used to model observable properties whose values change during runtime, for example power consumption, cycle time per transaction, information about branch mis-predictions, cache misses, stalls, etc.

The one or more features identifying execution behaviour of the component model can take a variety of forms. In one embodiment, such features indicate the behaviour of execution of code forming the component model. Hence, such features may provide line, statement, and/or edge coverage information identifying how the code forming the component model is executing. It should be noted that this information is not providing information about any application code that may be being run on the model. For example, if the model is modelling aspects of a processor, the input stimulus to the component model may actually be application code designed to run on the processor. In such an embodiment, it should be noted that the one or more features obtained from the component model though use of the feature extraction logic is indicating the behaviour of execution of the code forming the component model i.e. of the code used to model the hardware component, but does not provide any information about the execution of the application code used as input stimulus to the component model. Accordingly, in such embodiments code coverage type techniques can be used by the feature extraction logic to extract information about execution of the component model, which is itself a program but is not the program running on the device (e.g. CPU) being modelled. It should be noted that such code coverage information is not being produced in order to test the component model code in any way, but instead is being used to derive additional information not directly available from the component model, in order to form a suitable input for a statistical model.

It should be noted that since the one or more features output from the component model are indicating the behaviour of the execution of the code forming the component model, and have nothing to do with any application that may be running on the component model, the same technique can also be used when modelling hardware components that do not run programs, for example cache logic, bus logic, etc.

In one embodiment, said one or more features identifying execution behaviour provide internal state information of the component model. This will typically be internal state which is not naturally output by the component model when executing, but which can provide useful input to the statistical model in order to enable it to generate a value of the observable property of the hardware component.

As mentioned earlier, in one embodiment, the feature extraction logic may employ code coverage techniques in order to extend the component model so that the component model outputs features identifying the execution behaviour of the component model.

In accordance with the above-described techniques, the execution characteristics of the component model are extracted as features, for example which lines of the code in the model are executed on each "tick" of the model, a "tick" being one iteration of execution of the component model. These features can then be output periodically, and in one embodiment are output as a vector on each tick of the model, and are then used as input stimulus to the statistical model.

The feature extraction logic can take a variety of forms. However, in one embodiment, the feature extraction logic is contained within a compiler used to compile source code in order to produce said component model, such that when the source code is compiled the component model is extended, whereafter when the component model is executed the component model outputs said one or more features. Hence, in such embodiments, the component model is automatically extended at the time the source code is compiled.

In an alternative embodiment, the feature extraction logic is arranged to annotate source code prior to that source code being compiled to form said component model, such that when the component model is executed the component model outputs said one or more features. Hence, as an example of such an embodiment, a feature extraction tool may be used to annotate the source code prior to that source code then being compiled by a standard compiler.

In an alternative embodiment, the feature extraction logic is arranged to dynamically annotate said component model as the component model is executed such that said one or more features are output by the component model. As an example of such a technique, binary instrumentation techniques can be used to dynamically annotate the component model whilst it is executing.

Irrespective of which of the above embodiments feature extraction logic is used, guidance input may be provided to the feature extraction logic to identify areas of interest within the component model for which features should be output. This guidance input may be partially automated, or can involve manual input of guidance information.

In one embodiment, parameters of the statistical model parameters are trained using reference data correlated with execution of the component model, the reference data identifying values of said observable property, and the statistical model being arranged to train the statistical model parameters based on said one or more features output by the component model and the values of said observable property indicated by the reference data.

There are a number of ways in which the reference data can be correlated with execution of the component model. In one embodiment, the component model is arranged when provided with input stimulus to output said one or more features, and the reference data is correlated with the input stimulus.

In one particular embodiment, the reference data is obtained from a reference system which receives as its input the same input stimulus as is provided to the component model whilst the statistical model is being trained. The reference system may be a hardware device, or alternatively can be a model, in the latter case that model typically being a lower level model than the component model, which is arranged to accurately model at least those aspects of the hardware component required to produce accurate reference data. In alternative embodiments, the reference data can be prepared by hand.

In one embodiment, the statistical model employs data mining techniques to train the statistical model parameters. Data mining is a well known technique for automatically searching large volumes of data for patterns using association rules.

Decision tree learning can be used in one embodiment by the statistical model. In one particular embodiment, the statistical model is a regression tree based model with the leaf nodes of the tree identifying values of the observable property.

In one embodiment, the statistical model is arranged to generate further additional information about the value of the observable property output by the statistical model. As an example, such additional information may give an indication as to the confidence that can be associated with the value output, for example an indication about how accurate that value can be considered to be.

Whilst in one embodiment the statistical model may be arranged to solely use the one or more features output by the component model as a result of the component model being extended by the feature extraction logic, in other embodiments the component model is arranged to generate data pertaining to the aspects of the hardware component being modelled, and the statistical model is arranged to generate said output with reference to both that data and said one or more features, Hence, in such embodiments, the one or more extracted features are used in combination with the usual output from the component model, and the statistical model makes use of all of that information when generating its output.

The hardware component being modelled may take a variety of forms, but in one embodiment may be a processor such as a central processing unit (CPU). In other embodiments, the hardware component may be a digital signal processor (DSP), a direct memory access (DMA) controller, a bus, a memory, a hardware accelerator, etc.

The observable property of the hardware component can take a variety of forms. However, in one embodiment, the observable property is power consumption of the hardware component, which as described earlier is difficult to model using known techniques. In alternative embodiments, the observable property may be cycle time per transaction, information about branch mis-predictions, cache misses, stalls, etc.

The component model may take a variety of forms, and hence for example may be an instruction set simulator (ISS) model, a cycle-accurate model, a transactional model, an RTL model, etc. In one embodiment, the component model will be a legacy model which does not directly model the observable property, but whose execution behaviour may inherently provide features from which values of that observable property are derivable by the statistical model.

In one embodiment, the statistical model provides feedback data to the feature extraction logic, the feature extraction logic being responsive to the feedback data to repeat the process of extending the component model so as to alter the one or more features subsequently output by the component model. Hence, as an example, this feedback data may identify particular lines or edges in the model code which seem to be significant in determining the value of the observable property, and this information can be used by the feature extraction logic to revise the way in which the component model is extended, for example so as to provide more features in the particular areas of the model indicated by the feedback data as being important.

In one embodiment, multiple features are output by the component model as a result of the feature extraction process, and the statistical model provides feedback data identifying the relative importance of the features within said multiple features. In this embodiment, that feedback data may not directly be fed back to the feature extraction logic, but can be used to enable an analysis of what properties of the original model are being used to make the predictions. This analysis may be performed by some separate tool, or manually by the programmer. For example, the feedback could be used to indicate important source lines in the model source code which could then be studied by a modelling engineer. If the engineer can understand these as inferring certain conditions, the conditions could then be explicitly modelled more accurately or efficiently and used directly by the statistical model.

Viewed from a second aspect, the present invention provides a method of operating a computer system to model a hardware component of a data processing apparatus in order to generate an output identifying a value of an observable property of the hardware component, comprising the steps of: executing a component model to model aspects of the hardware component; executing a feature extraction process to extend the component model to cause the component model when executing to output one or more features identifying execution behaviour of the component model; inputting to a statistical model said one or more features output by the component model; and executing the statistical model to generate said output dependent on said one or more features.

Viewed from a third aspect, the present invention provides a computer program product comprising a computer program which when executed on a computer causes the computer to perform a method in accordance with the second aspect of the present invention.

BRIEF DESCRIPTION OF THE DRAWINGS

The present invention will be described further, by way of example only, with reference to embodiments thereof as illustrated in the accompanying drawings, in which:

FIG. 7 illustrates an example of a code coverage technique that can be used during the feature extraction process to extend the component model in accordance with one embodiment of the present invention; and FIG. 8 is a diagram schematically illustrating how the statistical model of embodiments of the present invention may be trained using the extracted features illustrated in FIG. 7 and reference data obtained from a reference source.

DESCRIPTION OF EMBODIMENTS

Figure 1A:
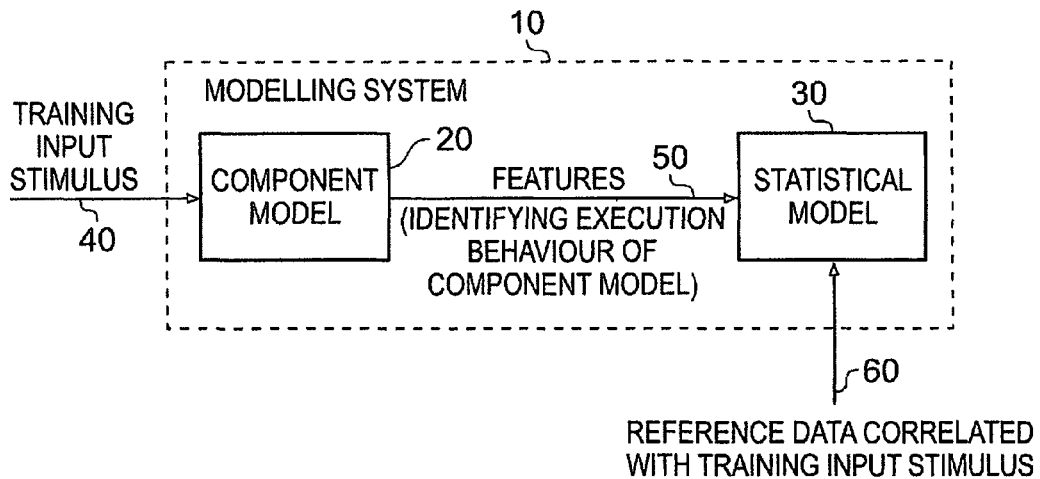
FIG. 1A and FIG. 1B are block diagrams illustrating the basic operation of a system for modelling a hardware component in accordance with one embodiment of the present invention.
Figure 1B:
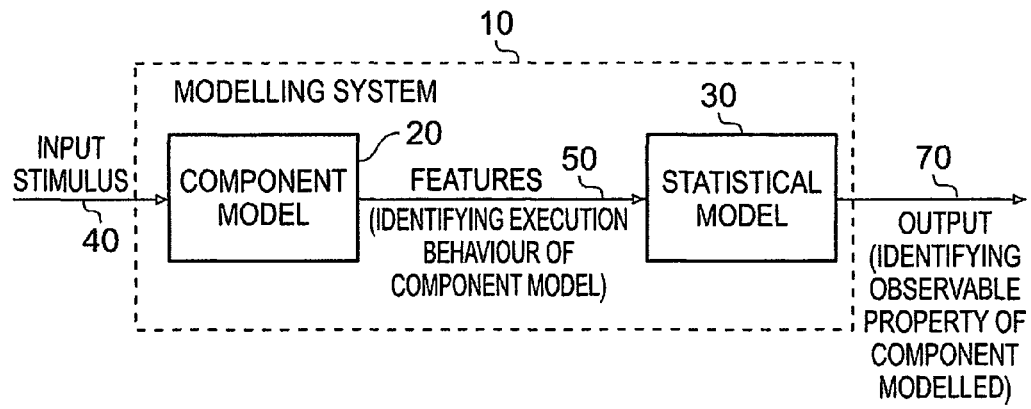

FIG. 1A and FIG. 1B are block diagrams schematically illustrating a system for modelling a hardware component of a data processing apparatus in accordance with one embodiment of the present invention. FIG. 1A shows the configuration of the modelling system 10 during a training operation, and FIG. 1B illustrates the configuration of the modelling system 10 in use following a training operation. As shown, the modelling system comprises a component model 20 which is arranged to model aspects of the hardware component, and is coupled to a statistical model 30. It is the aim of the modelling system 10 to provide during normal use an output over path 70 identifying values for an observable property of the hardware component being modelled. Although the component model models aspects of the hardware component, it is unable by itself to provide accurate values for the observable property of interest. This may be due to the fact that the component model does not model the hardware component to a sufficient level of detail to enable accurate values for the observable property to be output, or because the observable property is inherently difficult to model using traditional modelling techniques.

Nevertheless, in accordance with embodiments of the present invention, even though the component model may not explicitly model aspects that can be used to effectively predict values of the required observable property, it has been observed that the underlying execution characteristics of the component model 20 can provide suitable input to the statistical model 30 to enable the statistical model to predict values of the observable property, following a suitable training phase. Accordingly, as will be discussed in more detail with reference to FIGS. 2A to 2C, feature extraction logic is used to extend the component model 20 to cause the component model, when executing, to output one or more features identifying execution behaviour of the component model. These features may indicate the behaviour of execution of code forming the component model and/or provide internal state information of the component model. Typically, although this is not essential for all component models, the component model 20 will be triggered by the receipt of input stimulus over path 40 to execute the component model code in order to generate an output, the one or more features resulting from the feature extraction process being output over path 50 at that time.

In one embodiment, during a training phase, training input stimulus is issued to the component model 20 over path 40, and in addition reference data correlated with that training input stimulus is forwarded to the statistical model 30 over path 60. The reference data will provide values of the observable property correlated with the training input stimulus, and such reference data can be obtained in a variety of ways. For example, it may be output by hardware, or alternatively can be output by a reference model (typically a lower level model than the component model 20), that reference model accurately modelling the aspects required to produce the reference data. It will be appreciated that such a detailed lower level model may take significantly longer to run than the component model 20, due to its increased complexity, and in such embodiments the reference data would typically be prepared offline and then when available will be provided to the statistical model whilst the correlated input stimulus is input to the component model 20.

The statistical model 30 is arranged during the training phase to train the statistical model parameters based on the values of the one or more features output by the component model 20 over path 50 and the values of the observable property indicated by the reference data received over path 60. The statistical model 30 will then later be able to predict values for the observable property from features output by the component model 20 in normal use.

The statistical model can be arranged in a variety of ways, but in one embodiment employs decision tree learning. A decision tree is a predictive model that is a mapping of observations about an item to conclusions about the item's target value. In this embodiment, the features output by the component model are the observations about the item, and the item is the observable property. Two types of decision tree are known as the classification tree and the regression tree. A classification tree analysis can be used when the predicted outcome is the class to which the data belongs, whilst regression tree analysis can be used when the predicted outcome can be considered a real number. In one particular embodiment of the present invention, the statistical model is a regression tree based model.

Once reference data has been used to train the parameters of the statistical model 30 in the manner described above, then subsequently the modelling system 10 can be used to directly provide values for the observable property over path 70 when the modelling system is provided with input stimulus over path 40. In particular, the input stimulus 40 is received by the component model 20 which then outputs features over path 50 to the statistical model, these features identifying the execution behaviour of the component model. The statistical model 30 can then predict from the incoming values of the features a value of the observable property, and output that value over path 70.

Figure 2A:
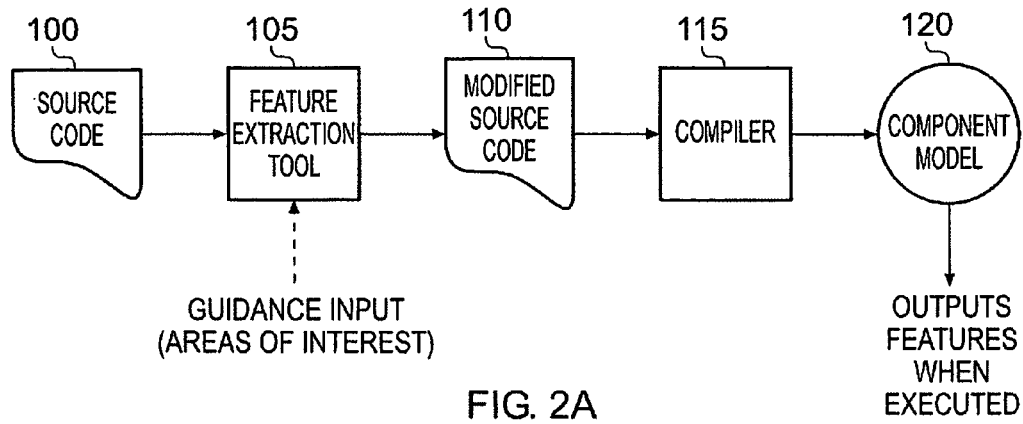
FIGS. 2A to 2C illustrate a feature extraction process for extending the component model used in FIGS. 1A and 1B in accordance with three different embodiments of the present invention.
Figure 2B:
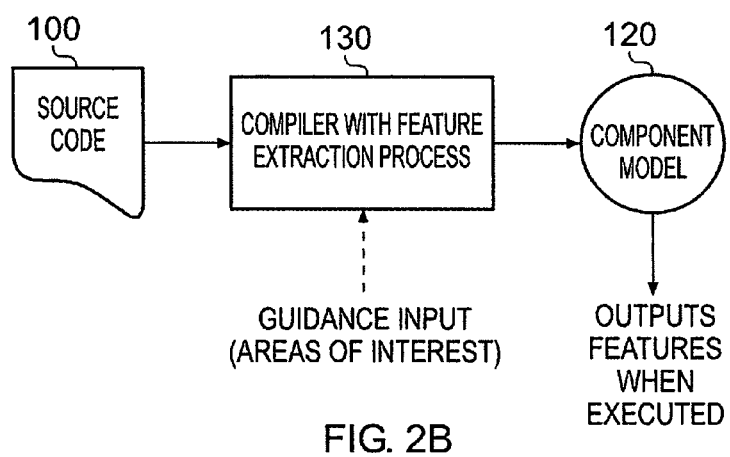
Figure 2C:
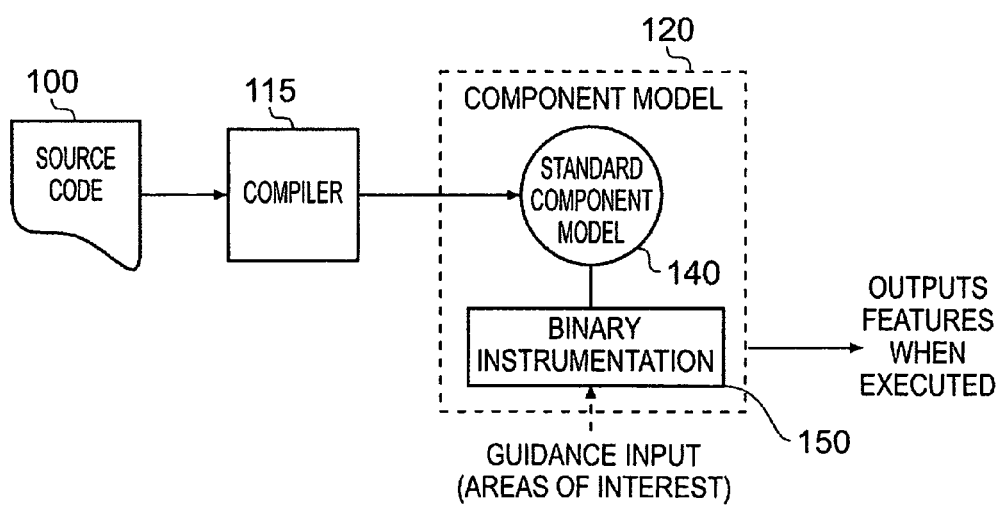

FIGS. 2A to 2C illustrate three different embodiments that may be used to perform the required feature extraction process to cause the component model 20 to output features identifying execution behaviour of the component model. Considering first FIG. 2A, the source code 100 for the component model is passed to a feature extraction tool 105, which dependent on guidance input that it receives, will annotate certain parts of the source code. For example, the guidance input may identify areas of interest within the source code which are considered to have some effect on the observable property to be modelled. For example, if the observable property to be modelled is power consumption, and the component model represents a processor core and its associated level 1 cache, it is likely that cache accesses will contribute significantly to power consumption, and accordingly those parts of the model code associated with cache accesses may in that instance represent an area of interest which should be annotated.

The feature extraction tool can perform the annotation in a variety of ways, but in one embodiment employs code coverage techniques to extend the component model. Accordingly, by way of example, particular lines in the source code may be annotated to add counters, with those counters being set each time the corresponding line is accessed. The output from the feature extraction tool 105 is hence modified source code 110 which incorporates the required annotations required to extend the component model, so that it will subsequently output, when executing, the required features indicative of execution behaviour of the component model.

Thereafter, the modified source code 110 is passed through a standard compiler 115, in order to generate the component model 120. When the component model 120 is subsequently executed, it will output one or more features, for example a sequence of counter values associated with particular lines in the model code, and this information indicative of the execution behaviour of the component model is then used by the statistical model 30 to produce values of the observable property.

In accordance with the embodiment in FIG. 2B, the compiler is modified to include the necessary feature extraction process. Accordingly, the source code 100 is input to this modified compiler 130, which in a similar way to the feature extraction tool 105 will receive guidance input indicative of areas of interest, and will accordingly annotate the code as it is compiled, resulting in the production of the component model 120 which when executed will output features indicative of the execution behaviour of the component model.

In accordance with the embodiment of FIG. 2C, the component model is dynamically annotated when executing such that the one or more features are output. Accordingly, the source code 100 is passed through a standard compiler 115 in order to produce a standard component model 140. However, the standard component model 140 will not output the features indicative of its execution behaviour, and instead a binary instrumentation tool 150 is coupled to the standard component model 140 to annotate the component model as it executes. The binary instrumentation tool 150 will receive guidance input in the same way that the feature extraction tool 105 of FIG. 2A or the compiler 130 of FIG. 2B does. In this example, the component model 120 can be thought to consist of the standard component model 140 and the associated binary instrumentation tool 150, and it is the component model 120 that then produces the required features when executing.

Figure 3:
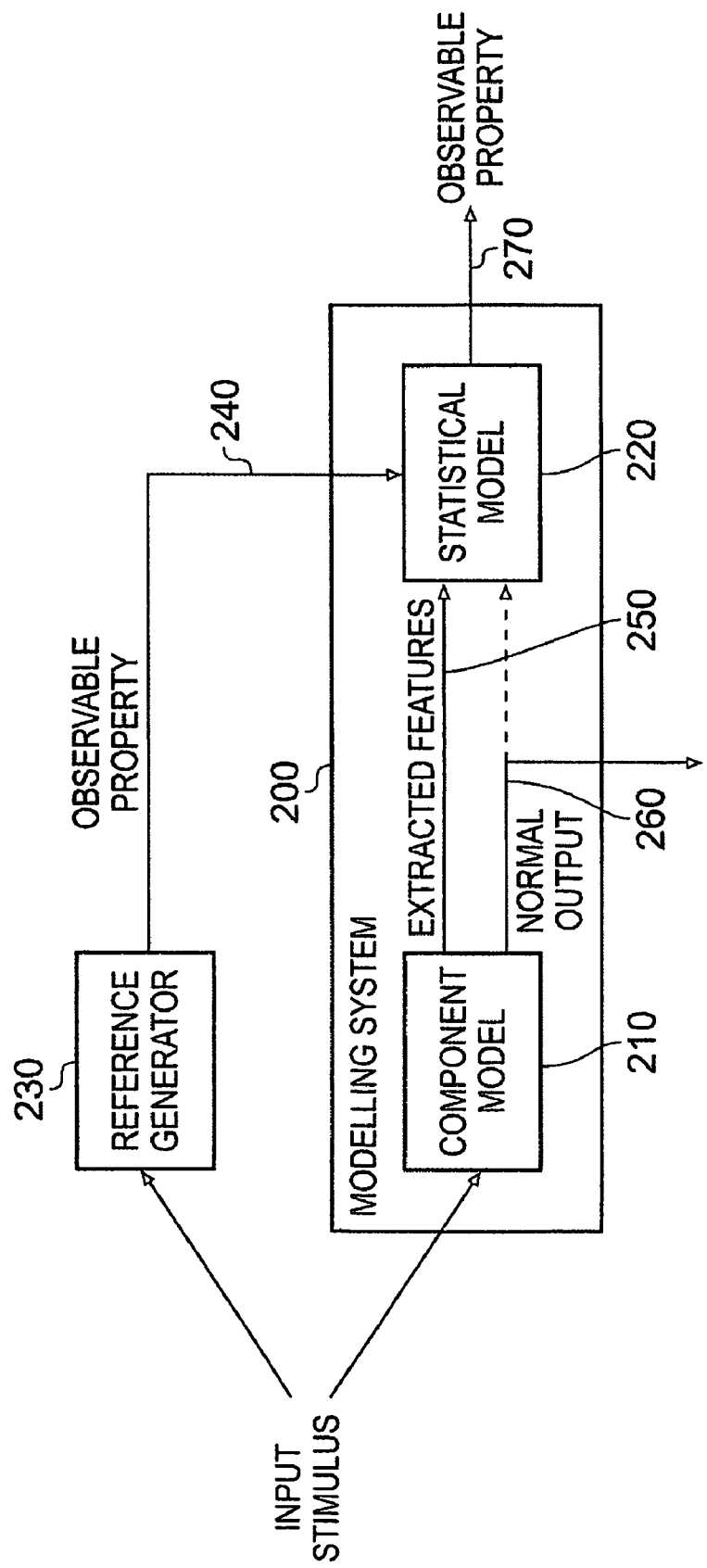
FIG. 3 is a block diagram illustrating a technique used in one embodiment of the present invention to produce reference data correlated with execution of the component model.

FIG. 3 is a further diagram illustrating an embodiment of a modelling system 200 in accordance with embodiments of the present invention. In accordance with this embodiment, a reference generator 230 is used to produce, during a training phase, reference data identifying reference values of the observable property, this reference data being passed over path 240 to a statistical model 220 within the modelling system 200. In this particular embodiment; the reference data is correlated with the training input stimulus by forwarding the same input stimulus to both the component model 210 and the reference generator 230. In one embodiment, the reference generator 230 may take the form of a low level model which is able to accurately predict values for the observable property. As mentioned earlier, such a model may be very expensive and complex, and take a long time to run, and accordingly is not practical for general use by all parties that may wish to model the observable property. Since the reference generator 230 would typically take significantly longer to run than the component model 210, then whilst it may operate off the same input stimulus, the input stimulus may not be provided to the reference generator 230 and the component model 210 at the same time. Instead, offline, the input stimulus may be provided to the reference generator 230 to produce a sequence of values of the observable property to form reference data. Thereafter, the modelling system 200 can be trained by providing the same input stimulus to the component model 210 whilst inputting the reference data over path 240 correlated with that training input stimulus.

In the manner discussed earlier, the component model 210 will have been extended by a feature extraction process, so that a number of extracted features are output over path 250 to the statistical model 220 dependent on the input stimulus. For example, each set of input stimulus will cause one iteration of execution of the component model, also referred to as a "tick" of the model, and the resultant features produced can be output as a vector on each tick of the model and used as input stimulus to the statistical model 220. As shown in FIG. 3, the component model 210 will also typically produce its usual output over path 260 (i.e. the output that it would have been produced prior to it being extended by the feature extraction process), and this normal output can be output in the usual manner, and in addition (as indicated by the dotted lines in FIG. 3) may also be input to the statistical model 220. In particular, in one embodiment, the normal output is used by the statistical model 220, in addition to the extracted features received over path 250, to produce values of the observable property.

During the training stage, the statistical model 220 trains the model parameters based on the received extracted features (and optionally the normal output over path 260) and the values of the observable property received as reference data over path 240. Subsequently, in normal use, the statistical model 220 determines from the received extracted features over path 250 (and optionally the values of the normal output received over path 260) a predicted value for the observable property and outputs that predicted value over path 270. It will be noted that at this point, the expensive and slow reference generator model 230 is no longer used, and the modelling system 200 then presents a relatively cheap, quick and simple mechanism for predicting values of the observable property from received input stimulus. Hence, it is likely that in many implementations, the modelling system 200 will, at least initially, be trained at some central location, and then copies of the modelling system 200 will be distributed to multiple users to provide those users with an effective tool for modelling the observable property.

Figure 4:
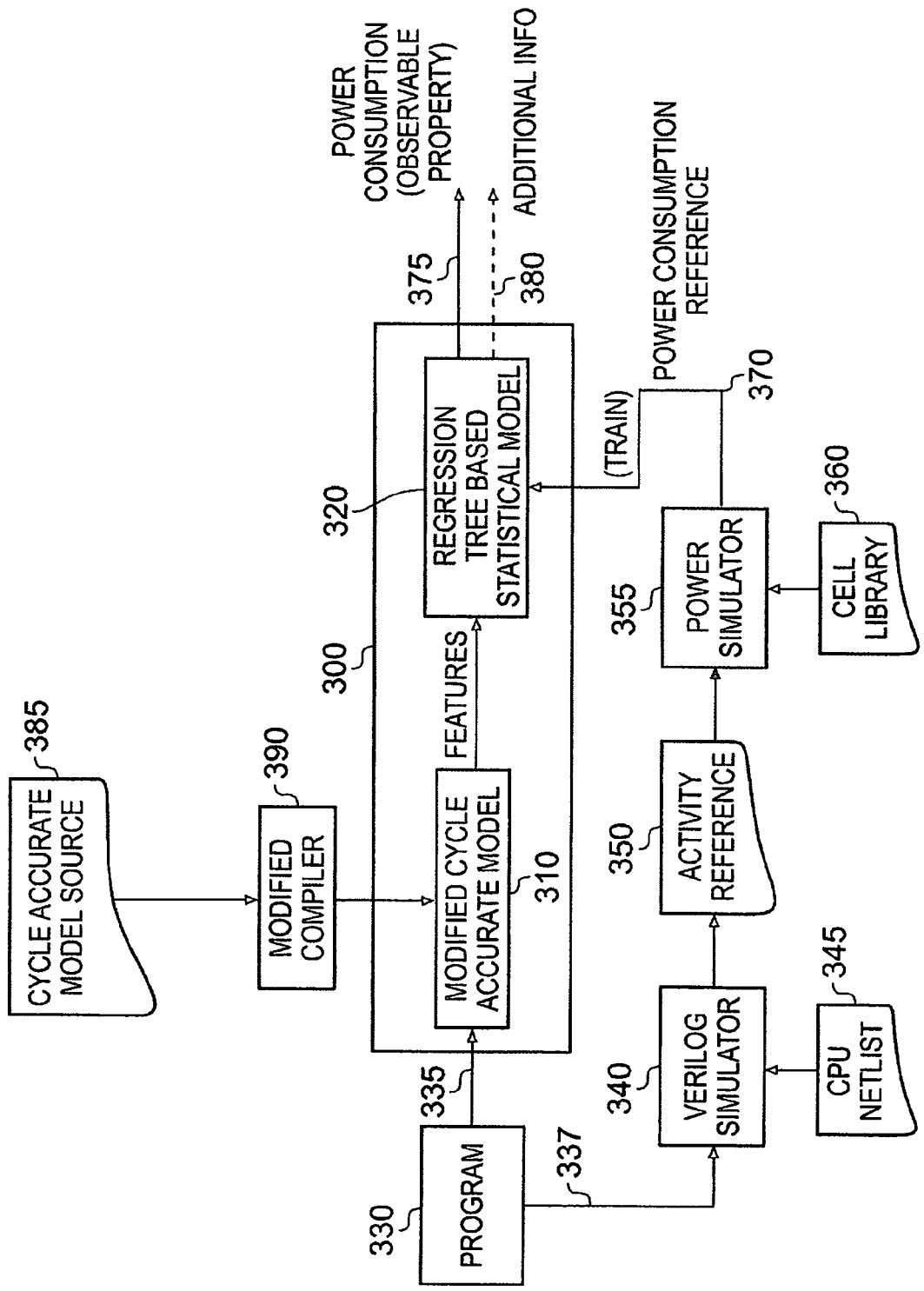
FIG. 4 is a block diagram illustrating an example of the use of the modelling system in accordance with one embodiment of the present invention.

FIG. 4 illustrates one particular implementation of an embodiment of the present invention, where the observable property to be modelled is power consumption of a processor. In this particular example, it is assumed that there is a cycle accurate model of the processor available, and the source code for that cycle accurate model 385 is passed through a modified compiler 390 in order to produce a modified cycle accurate model 310 to form the component model of the modelling system 300. Accordingly, the modified compiler 390 operates in the same manner as the compiler 130 of FIG. 2B to extend the cycle accurate model so that, when executed, it will produce features indicative of execution behaviour for forwarding to the statistical model 320, which in this particular example is assumed to be a regression tree based statistical model.

In this example, a program 330 intended for running on the processor is used to form input stimulus to both the modified cycle accurate model 310 over path 335 and a Verilog simulator 340 over path 337. The Verilog simulator 340 is used in combination with a power simulator 355 to produce power consumption reference data. In particular, the Verilog simulator 340 has access to a CPU netlist 345 describing the CPU at the transistor/gate level. Based on the received input program 330, the Verilog simulator 340 determines activity within the CPU, and produces an activity reference list 350 identifying for example a series of logical transitions taking place within the CPU when running that program. This activity reference list 350 is then provided as an input to the power simulator model 355, which also has access to a cell library 360 identifying power consumption for particular logical transitions. Accordingly, using the activity reference list 350, the power simulator 355 can reference the cell library 360 in order to determine the power consumption associated with the identified activities, and can output that power consumption information as reference data over path 370 to the regression tree based statistical model 320 during a training phase.

In a similar manner to that discussed earlier, the statistical model 320 then seeks to train the model parameters based on the features received from the modified cycle accurate model 310 when that model executes the same program 330, and the power consumption reference data received from the power simulator 355. Subsequently, when the training phase is complete, the elements 340, 345, 350, 355 and 360 forming the reference generator are removed, and when further programs 330 are executed on the modelling system 300, the corresponding features output by the modified cycle accurate model 310 are used by the statistical model 320 to predict values of power consumption which are output over path 375.

In some embodiments, the statistical model can also be arranged to output additional information over path 380. This additional information may for example take the form of confidence data indicating an accuracy that is associated with the predicted values output over path 375. Such information may prove useful when analysing the power consumption values output over path 375.

Further, in one embodiment, the additional information output over path 380 can be used as feedback data. In one particular embodiment, this feedback data may be routed back to the modified compiler 390, and used subsequently to re-compile the cycle accurate model source code 385 in order to produce a new version of the modified cycle accurate model 310. Hence, as an example, the feedback data may identify particular lines or edges in the model code which seem to be significant in determining the power consumption, and this can be used by the modified compiler 390 to revise the way in which the cycle accurate model source code is extended, so as to provide more features in the particular areas of the model indicated by the feedback data as being important. Alternatively, the feedback data may not directly be fed back to the modified compiler 390, but instead may be used to enable an analysis of what properties of the original model are being used to make the predictions. If, for example, the modelling engineer can determine from this feedback data certain conditions which appear to be important in influencing power consumption, those conditions could then be explicitly modelled more accurately to produce a revised cycle accurate model source code 385, so that subsequently the amount of feature extraction required to be performed when compiling could be reduced, and instead the normal output from the compiled cycle accurate model 310 will provide more useful information that can be used as input to the statistical model 320.

Figure 5:
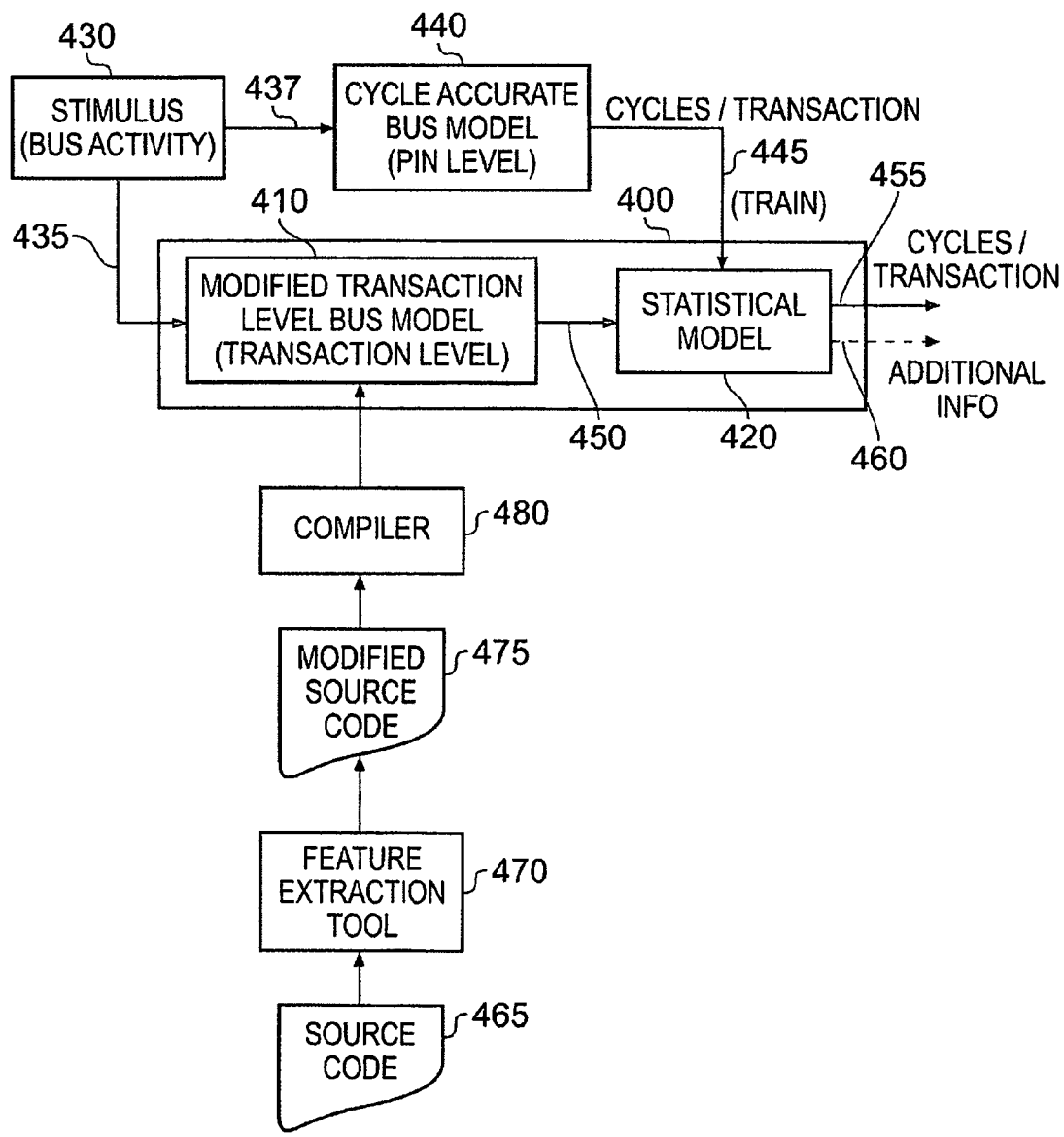
FIG. 5 is a block diagram illustrating an example of the use of the modelling system in accordance with another embodiment of the present invention.

FIG. 5 illustrates an alternative embodiment of the present invention, where the modelling system 400 is used to model a bus and produce as the observable property cycles per transaction information. In this example, source code 465 representing the bus model is passed through a feature extraction tool 470 in order to annotate that code and produce modified source code 475, which is then passed through a standard compiler 480 to produce the modified bus model. Hence, in this example, the feature extraction process of FIG. 2A is used.

In this particular embodiment, it is assumed that the model is a transaction level bus model and hence will not typically have any details about the wiring making up the bus, but instead will merely model the basic activity of the bus at the transaction level, for example by updating the state of the model when a write transaction causes a burst of data to be written to a particular address, etc.

In this example, a lower level bus model in the form of a cycle accurate bus model 440 models the bus at the pin level, and accordingly has information about the wiring within the bus model, and at least basic information about how long certain paths through the model take to traverse. During a training phase, input stimulus 430 in the form of bus activity is routed over path 437 to the cycle accurate bus model 440, as a result of which reference data is output over path 445 in the form of cycles per transaction. The same stimulus 430 is also output over path 435 to the modified transaction level bus model 410, to cause features to be output over path 450 to the statistical model 420, which then seeks to train the model parameters based on those features and the input reference data over path 445. In this particular example, the statistical model may be seeking to identify for each combination of input features, a value of cycles per transaction to associate with that combination.

Following the training phase, the cycle accurate bus model 440 is no longer used, and instead the simplified model 400 consisting of the modified transaction level bus model 410 and the statistical model 420 is used by itself to predict future cycles per transaction values based on input bus activity and output those values over path 455. As with the example of FIG. 4, additional information can also be output from the statistical model 420 over path 460 to provide an associated confidence indication, to provide feedback data, etc. If the feedback data were to be used to re-annotate the code, that feedback data would be forwarded to the feature extraction tool 470 to enable a revised modified source code 475 to be produced which could then be compiled by the compiler 480 to produce a revised modified transaction level bus model 410.

Figure 6:
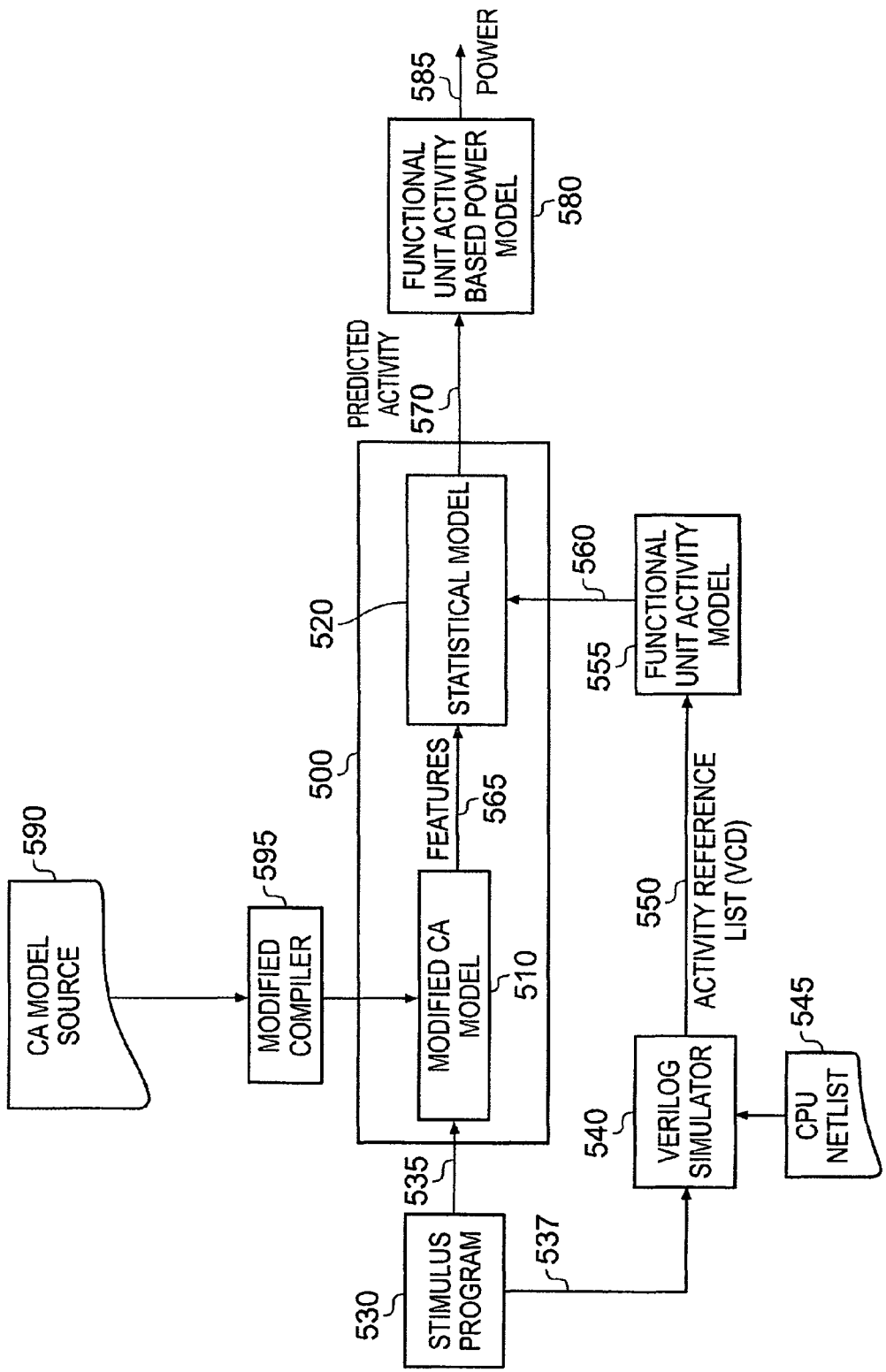
FIG. 6 is a block diagram illustrating another example of the use of the modelling system in accordance with an alternative embodiment of the present invention.

FIG. 6 illustrates an alternative embodiment of the present invention, where the observable property output from the modelling system 500 is itself used as an input to a further model in order to produce values of a property of interest. As a particular example of the use of a system such as that illustrated in FIG. 6, a cycle accurate model source code 590 may provide a cycle accurate model of a processor, including its associated register file, and it may be desired to determine the power consumed by the register file. The source code for the cycle accurate model 590 is passed through a modified compiler 595 in order to produce a modified cycle accurate model 510 which when executed will output features over path 565 indicative of the execution behaviour of that modified cycle accurate model. The modified compiler 595 will operate in the same manner as the compiler 130 described earlier with reference to FIG. 2B.

During a training phase, a program 530 to be executed on the processor will be used as input stimulus to a Verilog simulator 540 coupled to a CPU netlist 545. In a similar manner to that discussed earlier with reference to FIG. 4, the Verilog simulator 540 will output an activity reference list (in some embodiments known as a value change dump (VCD)) over path 550 to a functional unit activity model 555. This functional unit activity model 555 will in the above example model a register file, and based on the activity reference list received over path 550 (which will identify for example gate level transactions) will work out when the register file is accessed, resulting in an activity reference signal being output over path 560 to the statistical model 520. This activity reference data will hence for example identify when the register file is accessed, and in the event that it is accessed whether it is accessed for a read or a write operation.

Correlated with the receipt of the activity reference data over path 560, the same stimulus program 530 will also be input over path 535 to the modified cycle accurate model 510, and the corresponding features output over path 565 will be input to the statistical model 520 which will seek to train the model parameters based on those features and the activity reference data received.

Following the training phase, the elements 540, 545, 555 will be removed, and when subsequent stimulus programs 530 are input to the modelling system 500, the features extracted from the modified cycle accurate model 510 will be used by the statistical model 520 to predict the activity of the register file, with this predicted activity data being output over path 570. As mentioned previously, the actual property of interest is the power consumed by the register file. Assuming a model 580 exists as a functional unit activity based power model, in this case a power model for a register file, then the predicted activity information can be received by that power model 580 over path 570 and used to output a corresponding power consumption value over path 585. Hence, such a model 580 may identify that in any particular cycle, a read access will consume power X, a write access will consume power Y, and no access will consume power Z, and dependent on the predicted activity information received over path 570 can accordingly produce power consumption values output for the register file on a cycle by cycle basis.

Without the availability of the simple modelling system 500 of embodiments of the present invention, it would be necessary to stimulate a model such as the model 580 directly using output from a functional unit activity model such as the model 555, which would be significantly more complex, and take longer to run, than the modelling system 500 once that modelling system has been trained. Accordingly, the modelling system 500 provides a very simple, cost effective, mechanism for producing predicted activity information which can be used to stimulate an existing functional unit activity based power model 580.

FIG. 7 illustrates a simple example of how the component model code can be annotated by a feature extraction tool so as to cause the component model when executed to output features indicative of the execution behaviour of the model. In this simple example code segment, it is indicated that if an instruction is an add instruction, then an add operation is performed, if it is a multiply instruction then a multiplication operation is performed, and if it is a load instruction then a load operation is performed. In accordance with the feature extraction process, each of these lines of code is annotated with a counter value which is incremented when that line of code is executed. Hence, in particular, the four lines of code are annotated with the counters $c_0$, $c_1$, $c_2$ and $c_3$, respectively.

FIG. 8 illustrates how the counter values may be used by the statistical model. In particular, considering the earlier-described FIG. 3, it is assumed that the observable property to be output from the statistical model 220 is an indication as to whether the adder unit within a processor is in use. During a training phase, the reference generator 230 produces reference data over path 240, which in this particular example takes the form of a logic 1 value when the adder is in use and a logic 0 value when the adder is not in use. Such reference data may be produced by a reference model which models the processor to a sufficient level of detail that the model can directly determine when the adder is in use and when it is not. However, it is assumed that the higher level component model 210 does not model the required aspects of the processor to make that determination directly. However, due to the annotation performed by the feature extraction tool in FIG. 7, the component model 210 when executed does output features over path 250 to the statistical model 220, namely the values of the counters $c_0$, $c_1$, $c_2$ and $c_3$, which are indicative of the execution behaviour of the model.

During a training phase, a training process is performed by the statistical model 220 using the reference data obtained over path 240 and the features obtained over path 250. For the sake of illustration, it is assumed that the input stimulus used during the training phase is a code sequence taking the form of two add instructions, followed by a multiply instruction, followed by two load instructions, followed by another multiply instruction.

As a result of the training process performed by the statistical model, the statistical model may generate a table that encodes that if either the counter $c_1$ or the counter $c_3$ is set, then the output from the statistical model should be a logical 1 value, whereas otherwise it should be a logical 0 value. From this very simplified example, it will be appreciated that whilst the component model 210 itself is not modelling whether the adder is in use, the extracted features indicative of the execution behaviour of the model can be used to indicate when the adder is in use (namely when an add or a load instruction is executed), with the statistical model 220 training the model parameters based on various sequences of the counter values and the reference data, so that subsequently when the reference data is not present, the statistical model 220 can determine a suitable value to output based on sequences of features that it receives from the component model 210 when executing.

Whilst the example of FIGS. 7 and 8 is clearly a very trivial example, it assists in illustrating how extracted features indicative of the execution behaviour of the component model can be used by a statistical model to generate values of an observable property of interest, in situations where the component model does not model the aspects of the hardware component sufficiently to directly model that observable property.

From the above description, it will be seen that the embodiments of the present invention provide a way of extracting features from a component model which can then be used as a stimulus for a statistical model. This can be done in an automated manner, and does not require changes to the modelling methodology that it employs. In particular, such embodiments extract the execution characteristics of a model as features, for example which lines of the code in the model are executed on each tick of the model. These features can then be output as a vector each tick of the model, and used as input stimulus to the statistical model. Even though the component model may not replicate aspects of the hardware component associated with the observable property, they may be derivable from the features which are extracted, and these correlations can then be determined by the statistical model.

Accordingly, the embodiments of the present invention use the execution behaviour of the component model as a way of providing features, with these extracted features then being correlated with reference data in order to train the parameters of a statistical model. The techniques of embodiments of the present invention can be used in a wide variety of different implementations with the aim of modelling observable properties not available from the original model, and can be used for a wide variety of different hardware components. In particular, there is no requirement for the hardware component being modelled to execute code, since the code coverage techniques employed by the feature extraction process in accordance with certain embodiments of the present invention are performed in respect of the code forming the component model, and hence it is entirely immaterial as to whether the component being modelled itself executes code (for example a CPU) or does not (for example a bus).

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A computer system for modelling a hardware component of a data processing apparatus in order to generate an output identifying a value of an observable property of the hardware component, said computer system comprising:
   a component model for modelling aspects of the hardware component;
   feature extraction logic for extending the component model to cause the component model, when executing, to output one or more features identifying execution behaviour of the component model; and
   a statistical model arranged to receive said one or more features output by the component model, and to generate, dependent on said one or more features, said output identifying a value of an observable property of the hardware component, said computer system is implemented on a data processing apparatus.

2. A system as claimed in claim 1, wherein said features identifying execution behaviour indicate the behaviour of execution of code forming the component model.

3. A system as claimed in claim 1, wherein said features identifying execution behaviour provide internal state information of the component model.

4. A system as claimed in claim 1, wherein said feature extraction logic employs code coverage techniques to extend the component model.

5. A system as claimed in claim 1, wherein said feature extraction logic is contained within a compiler used to compile source code in order to produce said component model, such that when the source code is compiled the component model is extended, whereafter when the component model is executed the component model outputs said one or more features.

6. A system as claimed in claim 1, wherein said feature extraction logic is arranged to annotate source code prior to that source code being compiled to form said component model, such that when the component model is executed the component model outputs said one or more features.

7. A system as claimed in claim 1, wherein said feature extraction logic is arranged to dynamically annotate said component model as the component model is executed such that said one or more features are output by the component model.

8. A system as claimed in claim 1, wherein:
   parameters of the statistical model are trained using reference data correlated with execution of the component model, the reference data identifying values of said observable property, and the statistical model being arranged to train the statistical model parameters based on said one or more features output by the component model and the values of said observable property indicated by the reference data.

9. A system as claimed in claim 8, wherein the component model is arranged when provided with input stimulus to output said one or more features, and the reference data is correlated with the input stimulus.

10. A system as claimed in claim 9, wherein the reference data is obtained from a reference system which receives as its input the same input stimulus as is provided to the component model whilst the statistical model is being trained.

11. A system as claimed in claim 10, wherein the reference system is a reference model for the component and the component model is a higher level model than the reference model.

12. A system as claimed in claim 8, wherein the statistical model employs data mining techniques to train the statistical model parameters.

13. A system as claimed in claim 12, wherein the statistical model is a regression tree based model.

14. A system as claimed in claim 1, wherein the statistical model is arranged to further generate additional information about the value of the observable property.

15. A system as claimed in claim 1, wherein the component model is arranged to generate data pertaining to the aspects of the hardware component being modelled, and the statistical model is arranged to generate said output with reference to both that data and said one or more features.

16. A system as claimed in claim 1, wherein the hardware component is a processor.

17. A system as claimed in claim 8, wherein said hardware component is a processor, wherein the component model is configured, when provided with input stimulus, to output said one or more features, and the reference data is correlated with the input stimulus, wherein the input stimulus comprises application code to be executed by that processor.

18. A system as claimed in claim 1, wherein the observable property is power consumption of the hardware component.

19. A system as claimed in claim 1, wherein the statistical model provides feedback data to the feature extraction logic, the feature extraction logic being responsive to the feedback data to repeat the process of extending the component model so as to alter the one or more features subsequently output by the component model.

20. A system as claimed in claim 1, wherein said one or more features comprise a plurality of features, and the statistical model provides feedback data identifying a relative importance of the features within said plurality of features.

21. A method of operating a computer system to model a hardware component of a data processing apparatus in order to generate an output identifying a value of an observable property of the hardware component, comprising the steps of:
   executing a component model to model aspects of the hardware component;
   executing a feature extraction process to extend the component model to cause the component model, when executing, to output one or more features identifying execution behaviour of the component model;
   inputting to a statistical model said one or more features output by the component model; and executing the statistical model to generate, dependent on said one or more features, said output identifying a value of an observable property of the hardware component.

22. A computer program product including a non-transitory computer readable storage medium including a computer program which when executed on a computer causes the computer to perform the method of claim 21.

* * * * *